US 6,572,174 B2

(12) United States Patent
Hernandez et al.

(10) Patent No.: US 6,572,174 B2
(45) Date of Patent: Jun. 3, 2003

(54) VEHICLE STRUCTURE

(76) Inventors: Javier Hernandez, 3531 Gaviota Ave., Long Beach, CA (US) 90807; Alfredo Dominguez, 4233 Deeboyar Ave., Long Beach, CA (US) 90807

( * ) Notice: Subject to any disclaimer, the term of this patent is extended or adjusted under 35 U.S.C. 154(b) by 0 days.

(21) Appl. No.: 10/045,931

(22) Filed: Oct. 26, 2001

(65) Prior Publication Data

US 2003/0057725 A1 Mar. 27, 2003

Related U.S. Application Data

(60) Provisional application No. 60/296,339, filed on Sep. 24, 2001.

(51) Int. Cl.7 ................................................. B60P 7/02
(52) U.S. Cl. ......................... 296/100.09; 296/100.1; 296/163
(58) Field of Search ..................... 296/100.09, 100.07, 296/100.1, 100.08, 100.06, 163

(56) References Cited

U.S. PATENT DOCUMENTS

| 3,051,964 A | * | 9/1962 | Fisher et al. |
| 3,155,423 A | * | 11/1964 | Cripe |
| 3,202,455 A | * | 8/1965 | Grotz |
| 3,649,073 A | * | 3/1972 | Whittmore |
| 4,210,361 A | * | 7/1980 | Marvin et al. |
| 4,603,901 A | * | 8/1986 | McIntosh et al. |
| 4,824,162 A | * | 4/1989 | Geisler et al. |
| 4,946,217 A | * | 8/1990 | Steffens et al. |
| 5,364,154 A | * | 11/1994 | Kaiser |
| 5,366,266 A | * | 11/1994 | Harbison |
| 5,636,893 A | * | 6/1997 | Wheatley et al. |
| 5,951,095 A | * | 9/1999 | Herndon ............ 296/100.09 X |
| 6,209,944 B1 | * | 4/2001 | Billiu et al. ............ 296/100.02 |
| 6,217,102 B1 | * | 4/2001 | Lathers ................... 296/100.07 |
| 6,227,592 B1 | * | 5/2001 | Thacker ............. 296/100.07 X |
| 6,227,602 B1 | * | 5/2001 | Bogard ................... 296/100.06 |

* cited by examiner

Primary Examiner—Joseph D. Pape
(74) Attorney, Agent, or Firm—David A. Belasco; Belasco Jacobs & Townsley, LLP

(57) ABSTRACT

The structure illustrates is an articulating cover for the bed of a vehicle which includes a hinge connecting a first portion and a second portion and which can articulate as the cover is raised. This configuration provides a stable isolation to area over and both in and above the truck bed area. A higher level of articles can be stored in the truck bed area and still remain partially covered with the first portion providing a vertical shield from wind and shade. The truck bed can also accommodate passengers while provide shade both from the front vertical portion and the second portion which remains horizontal. The second attribute enables the truck bed to be converted into a comfort area especially amenable to sitting, relaxing and enjoying a view, tailgating and other activities involving the truck bed. The second use is especially useful where the vehicle travels to areas having little or no natural shade, where the second portion can provide shade from above and where the first portion may be positioned through the positioning of the vehicle to provide low angle shade.

9 Claims, 9 Drawing Sheets

VEHICLE STRUCTURE

This case depends from co-pending Provisional Patent Application No. 60/296,339 filed Sep. 24, 2001.

FIELD OF THE INVENTION

The present invention relates to vehicle accessories and more particularly to a deployable cover for a vehicle, especially the bed area of a truck.

BACKGROUND OF THE INVENTION

In the field of truck accessories, and more particularly truck bed lids, there are a variety of structures for simply covering the truck bed. Some lids are made of fabric or cloth and are tied on, while others are rigid and may be custom made for a tight fit. The majority of lids are used simply to store items in the truck bed, with the innovations based upon lockability, water sealing ability, accessibility, and the like. Similarly, for most of the lids, a different utilization of the truck bed requires at best a removal and temporary discarding of the lid and at worst a disassembly of the lid from the truck bed. Other uses include the possibility of (1) carrying a load which is higher than the rigid covering, (2) enabling persons to occupy the truck bed, and (3) providing some additional utility in its relation to the truck bed other than complete sealed covering.

Another aspect is cost. In order to provide a structure having wide acceptability, the cost must be low, while providing sufficient structural integrity. For example, some lids are remotely operable with jack screws in order to provide raising of the cover from the front and the rear or both. Each jack screw, its associated motor, and associated articulating arms, some of which may be scissors arms with significant moving parts, is quite expensive on its own. An articulated lid can utilize up to 8 such devices. The mix of utility and low cost must be adequately combined in order to yield a structure which has high utility and this is lacking in commonly available designs.

SUMMARY OF THE INVENTION

The structure illustrates an articulating cover for the bed of a vehicle which includes a hinge connecting a first portion and a second portion and which can articulate as the cover is raised. This configuration provides a stable isolation area over and both in and above the truck bed area. A higher level of articles can be stored in the truck bed area and still remain partially covered with the first portion providing a vertical shield from wind and shade. The truck bed can also accommodate passengers while providing shade both from the front vertical portion and the second portion which remains horizontal. The second attribute enables the truck bed to be converted into a comfort area especially amenable to sitting, relaxing and enjoying a view, tailgating and other activities involving the truck bed. The second use is especially useful where the vehicle travels to areas having little or no natural shade, where the second portion can provide shade from above and where the first portion may be positioned through the positioning of the vehicle to provide low angle shade. Further, shade from either of the first or second portion may be supplemented by either or both of a draped shade structure, or an extended shade structure to provide supplemental shade.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
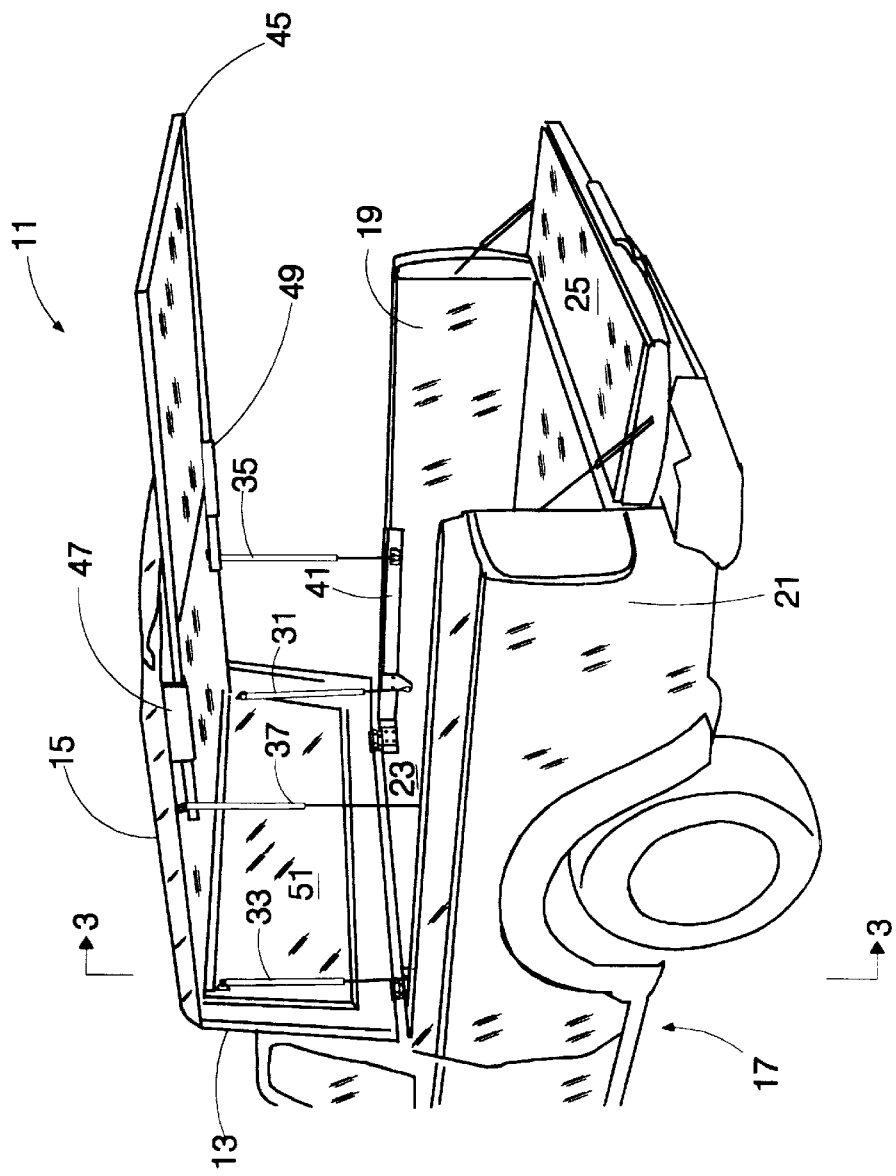
FIG. 1 is a perspective view of a truck vehicle with an open tail gate showing a typical installation of the lid and cover assembly of the present invention in the up position and illustrating the points of attachment to the vehicle, and a retractable shade, the view taken from a lower perspective.

The description and operation of the lid and cover assembly 11 of the invention will be best begun and described with reference to FIG. 1. Lid and cover assembly 11 includes a first portion 13 which has an articulating or pivoting attachment to a second portion 15. Typically the first portion 13 is pivotally attached to an upper forward section of a truck bed 17. Truck bed 17. typically has a right fender wall 19, the inside of which is shown in FIG. 1, a left fender wall 21, the outside of which is shown in FIG. 1, and a front wall 23, the inside of which is seen in FIG. 1.

Also seen in FIG. 1 is a tailgate 25 which is shown in the lowered or open position. The lid and cover assembly 11 is shown with four force spring assemblies, including a pair of forward spring assemblies including a right forward spring assembly 31, a left forward spring assembly 33, a right rear spring assembly 35 and a left rear spring assembly 37. The spring assemblies 31, 33, 35, and 37 are preferably gas spring assemblies which provide a rushing air resistance to the extension of a rod from within a spring cylinder. These gas spring assemblies provide force and motion which is dampened by the rushing displacement of air into the cylinder holding the force spring, typically through a small aperture, and prevent the displacement under force from being applied instantly. Other methods can be used to dampen the displacement rate.

The spring assemblies 31, 33, 35, and 37 are positioned with respect to the angle of mounting of the first and second portions to apply a proper amount of lifting force to assist in raising the lid and cover assembly 11, and to overcome the weight of the lid and cover assembly 11 when it is in raised position. Both the location points and angle of sweep can be adjusted to give desired force and displacement effects.

In FIG. 1, the spring assemblies 31 and 35 are shown as depending from a right "L" support 41. The ability to utilize a fixed support as right "L" support 41 will depend upon the configuration of the fender walls 19 and 21 of the truck bed 17 but should be generally utilizable. Truck bed 17 overall configuration will include the overall length and width, as well as the width of the fender walls 21 and 23, and the tail gate 25. As can be seen, depending upon the dimensions of the truck bed 17, the overall dimensions of the first and second portions 13 and 15 may change. In other words, different sized lid and cover assemblies 11 may be required for different makes and models of vehicles which have different sized truck beds 17.

The right fender wall 19, the inside of which is seen in FIG. 1 may be material which is added to the truck body to finish the truck bed 17, or it may have configurations which include reinforcing steel necessary to support the outside of the truck body, especially the outside of the fender walls 19 and 21, the outside of fender wall 21 being shown in FIG. 1.

Underneath second portion 15, which is shown as being in a substantially horizontal position, although this need not be the case, a rearwardly extending shade 45 is mounted to slide with respect to a pair of side frame supports 47 and 49. The rearwardly extending shade 45 may be made of a single extent of material or it may consist of a fabric covering suspended between rigid members. The rearwardly extending shade 45 may be completely light blocking, or if the material is thin enough it may be partially light transmissive. The rearwardly extending shade 45 is slidable with respect to the pair of side frame supports 47 and 49 in order to enable the rearwardly extending shade 45 to be deployed once the second portion 15 is brought to a raised position, and then retracted in order to lower the lid and cover assembly 11 onto the truck bed 17.

The manner of construction of the first and second portions 13 and 15 may be by any suitable method, but a shape which has an overall cap shape with reinforcing member 51 seen in FIG. 1 will serve to provide the structural strength needed and leave the outer peripheral under surface nearer the outside edges to form a cap overfit with respect to the bed 17 which is advantageous in sealing and keeping moisture out, even under driving conditions. Reinforcing member 51 may be a solid plate, honeycomb plate or other reinforcing structure and may be manufactured with the respective first or second portion 13 and 15.

Figure 2:
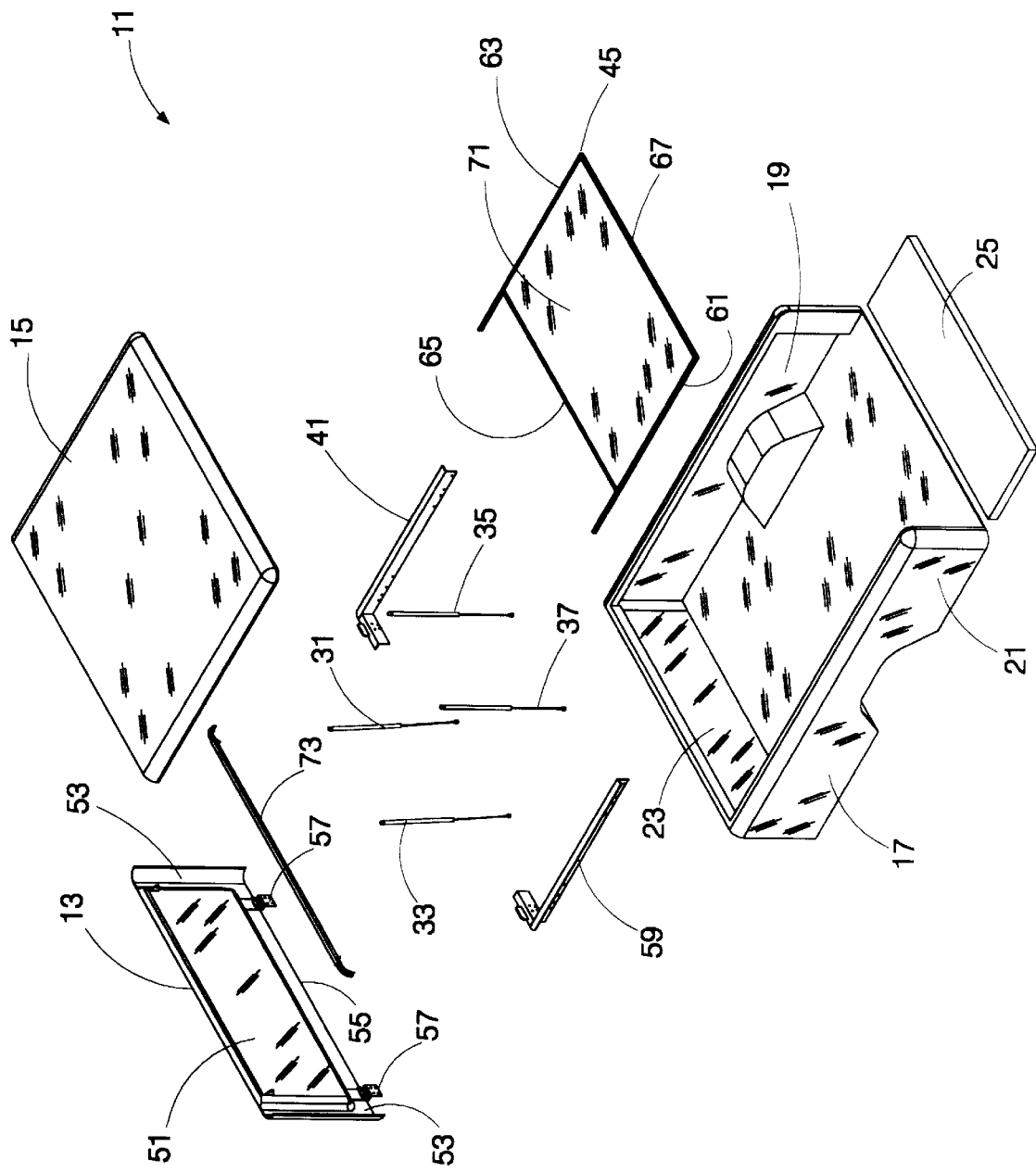
FIG. 2 illustrates a perspective exploded view of the lid cover assembly seen in FIG. 1 and shown over a somewhat schematic representation of the truck bed in isolation and seen as a view taken from an upper perspective.

Further detail of the lid and cover assembly 11 are seen beginning with FIG. 2. The exploded view illustrates first portion 13 as having more clearly seen curved peripheral regions 53. At a forward edge 55 a pair of hinges 57 are supplied for attachment to the right "L" support 41 and a left "L" support 59 seen for the first time. These structures fit within the forward corners of the truck bed 17 and thus gain significant stability from the truck bed 17 for both the hinges 57 and connection to the spring assemblies 31, 33, 35, and 37. Utilizing these "L" supports 41 and 59 permits a more modular construction and one in which the deployed lid and cover assembly 11 may simply be placed onto the truck bed 17 and bolted on. This also means that the complete lid and cover assembly 11 may be packaged and shipped in a completely assembled condition, but for the attachment of the "L" supports 41 and 59.

Also shown in greater detail is the rearwardly extending shade 45. Here the rearwardly extending shade 45 is seen as having a frame including side supports 61 and 63 which are cross braced by a fore support 65 and a rear support 67. Between the supports 61, 63, 65, and 67 may be extended a length of material 71. Again, any sort of rearwardly extending shade 45 need only have enough structural integrity to support itself from the underside of the second portion 15. A sealing member 73 can be seen and which can be added in the best manner to seal out moisture. One optimum position might be just ahead of the "L" supports 41 and 59.

Figure 3:
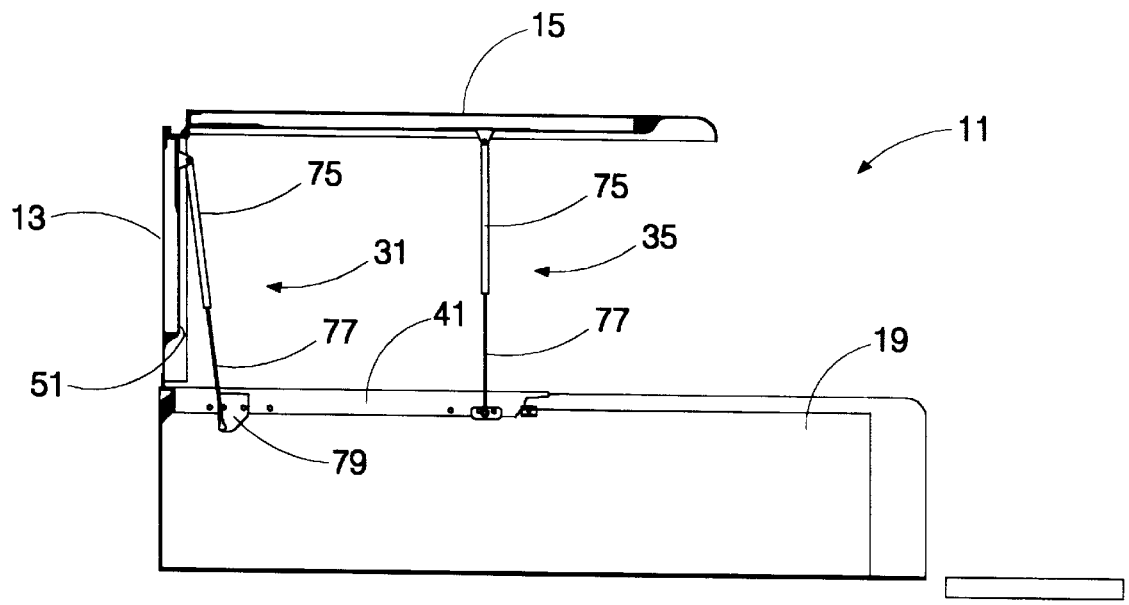
FIG. 3 illustrates a side view taken along section 3—3 of FIG. 1 and illustrates a unitary mounting bracket.

Referring to FIG. 3, a side view taken along line 3—3 of FIG. 1 is a view looking into the right side of the truck bed 17 and particularly directly across from the right fender wall 19 illustrates the lateral placement. The right "L" support 41 is seen as setting the spacing of the bottom of the spring assemblies 31 and 35. Each of the spring assemblies 31 and 35 shown, and this may be the case with all of the spring assemblies 31, 33, 35, and 37, has a cylindrical spring casing 75 and an extending plunger 77. The casings 75 are pivotally mounted to the first and second portions 13 and 15, while the plungers 77 are pivotally mounted to the right "L" support 41. This need not be the case and the position could be reversed. The plunger 77 end (not seen) within the casing 75 typically has a piston which dampens the movement of the plunger within the cylinder as the plunger 77 is being urged out of the casing 75.

As can be seen from the mounting angle, the right forward spring assembly 31 is acting to push the first portion 13 upward and, due to the triangular shaped formed between the first portion 13, right forward spring assembly 31 and displacement of the attachment end of plunger 77 from the axis of pivot of the first portion 13, pivotably forward (to the left taken from the perspective of FIG. 3.

Right rear spring assembly 35 will not apply compression until the second portion 15 is relatively closer to the upper surface of the right fender wall 19 at which time it also begins to exert force. In this configuration, both assemblies 31 and 35 will lift at the outset, but once the lid and cover assembly 11 is lifted about a foot above the right fender wall 19, the assembly 31 will bear the greater part of the load. Once the lid and cover assembly 11 is in its upper position, especially once the first portion 31 bears on its own hinged connection with the truck bed 17, and once the right rear spring assembly 35 has achieved a vertical position, it takes very little force to keep the lid and cover assembly 11 upright. Thus, the triangular configuration referred to with respect to right forward spring assembly 31 is sufficient to keep the cover assembly 11 up right, especially if the vehicle is not moving. It is possible to mount the pivoting end of the plunger 77 of the right forward spring assembly 31 further rearward and away from front wall 23 in order to place more force in the forward direction. This may especially be the case where more upward and forward force is desired, and may include instances where the vehicle is to be operated with the lid and cover assembly 11 extending over a load. Also seen is a multi-position bracket 79 having a pair of mounting holes for bolting onto right "L" support 41. There are four holes in "L" support 41 to enable 3 positions which differ from forward to rear location, to enable the user to more highly customize the force and displacement characteristics of the lid and cover assembly 11.

Figure 4:
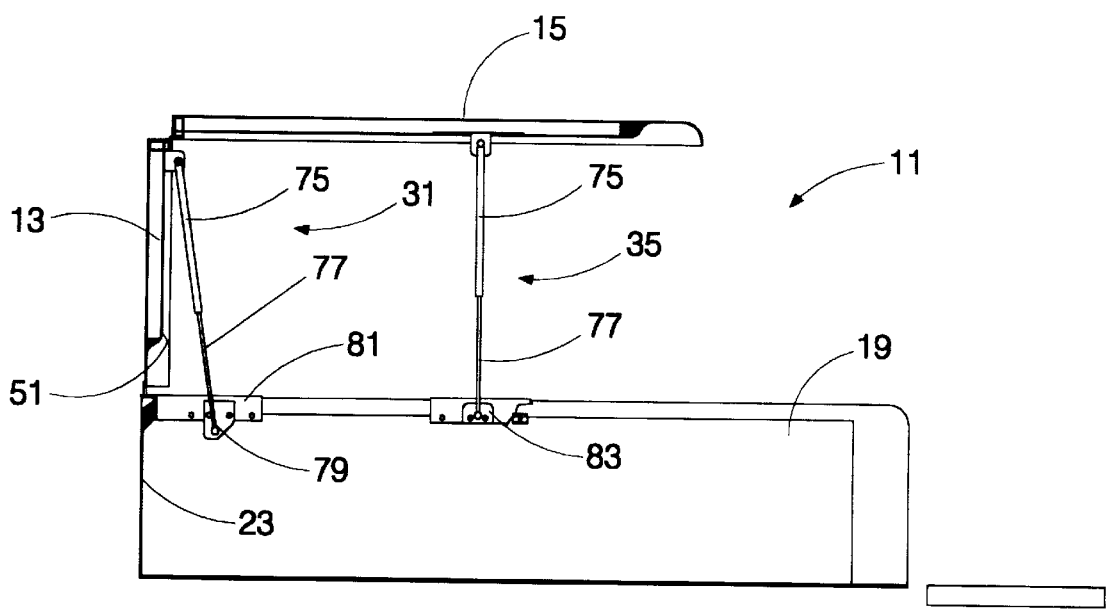
FIG. 4 illustrates a side view taken along section 3—3 of FIG. 1 and illustrates a two-piece, segregated mounting bracket which will allow some movement of the rear bracket, especially where an obstruction dictates that it be displace forwardly or rearwardly.

Referring to FIG. 4, a variation on the view of FIG. 3 is shown where the right "L" support 41 is replaced by a shortened "L" support 81 which terminates just to the rear of the located of holes for supporting the bracket 79. A separate bracket 83 is not connected to the right "L" support 41 and may be mounted at varying distances behind the support 41 to effect the force and height characteristics of the lid and cover assembly 11. In some cases, there may be some obstructions along the inside of the right fender wall 19 and a separate bracket 83 can be utilized to provide a mounting at a location to avoid any physical conflict. In this case, there may also be additional pivot point structures on the bottom of the second portion 15 of the lid and cover assembly to allow the spring assembly 35 to be moved forwardly or rearwardly without significantly affecting the force and displacement characteristics of the lid and cover assembly 11.

Figure 5:
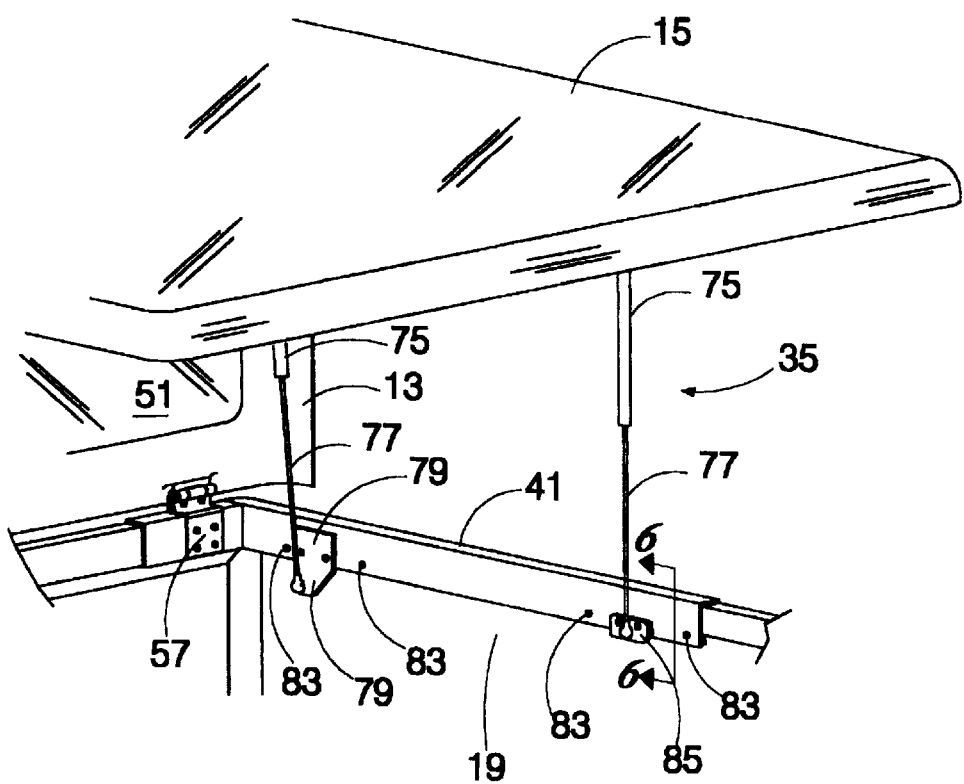
FIG. 5 is a perspective view looking into the right front corner of the truck bed from an upper position looking down and illustrating the details of a right "L" support and its brackets.

Referring to FIG. 5, a perspective view looking forward into the area seen in FIG. 3 shows the full extent of the right "L" support 41, and including bracket 79. A series of holes 83 are seen which enable the adjustability of bracket 79, as well as a short bracket 85 supporting the right rear spring assembly 35.

Figure 6:
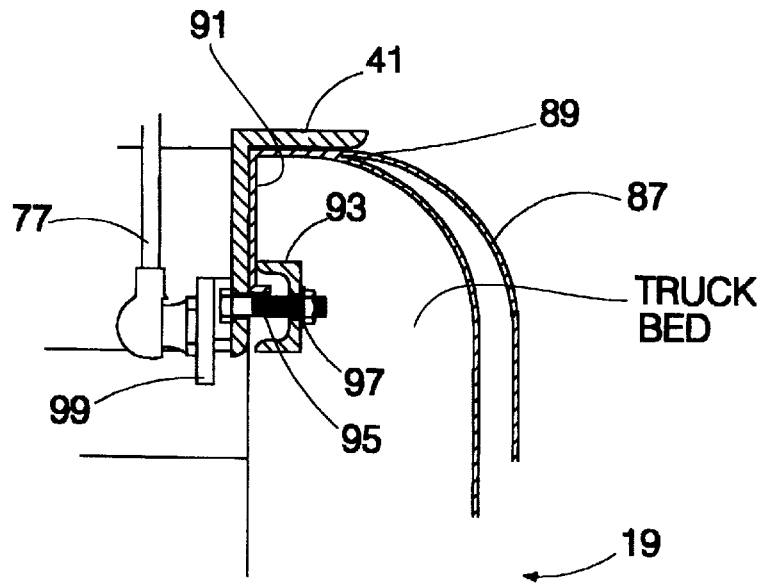
FIG. 6 is a section taken along line 6—6 of FIG. 5 and illustrating the details of attachment of a spring assembly to a fender wall.

Referring to FIG. 6, a sectional view taken along line 6—6 of FIG. 5 illustrates a sectional view of the right fender wall 19 and which includes an outer wall 87 extending to a horizontal upper portion 89 and thence to a vertical inner wall 91. The right "L" support 41 is seen as fitting over the apex of the vertical inner wall 91 and the horizontal upper portion 89. In the view shown, the vertical inner wall 91 terminates after about two or three inches from the apex. Consequently, a grabbing "U" shaped fitting 93 is secured with a bolt 95 and nut 97. This secures the right "L" support 41 whether or not the bolt 95 is used in conjunction with a drilled aperture in the vertical inner wall 91.

A pivot fitting 99 provides pivoting about an axis of the extending plunger 77 of the right rear spring assembly 35. A similar fitting may be utilized with the other spring assemblies 31, 33, 35, and 37.

Figure 7:
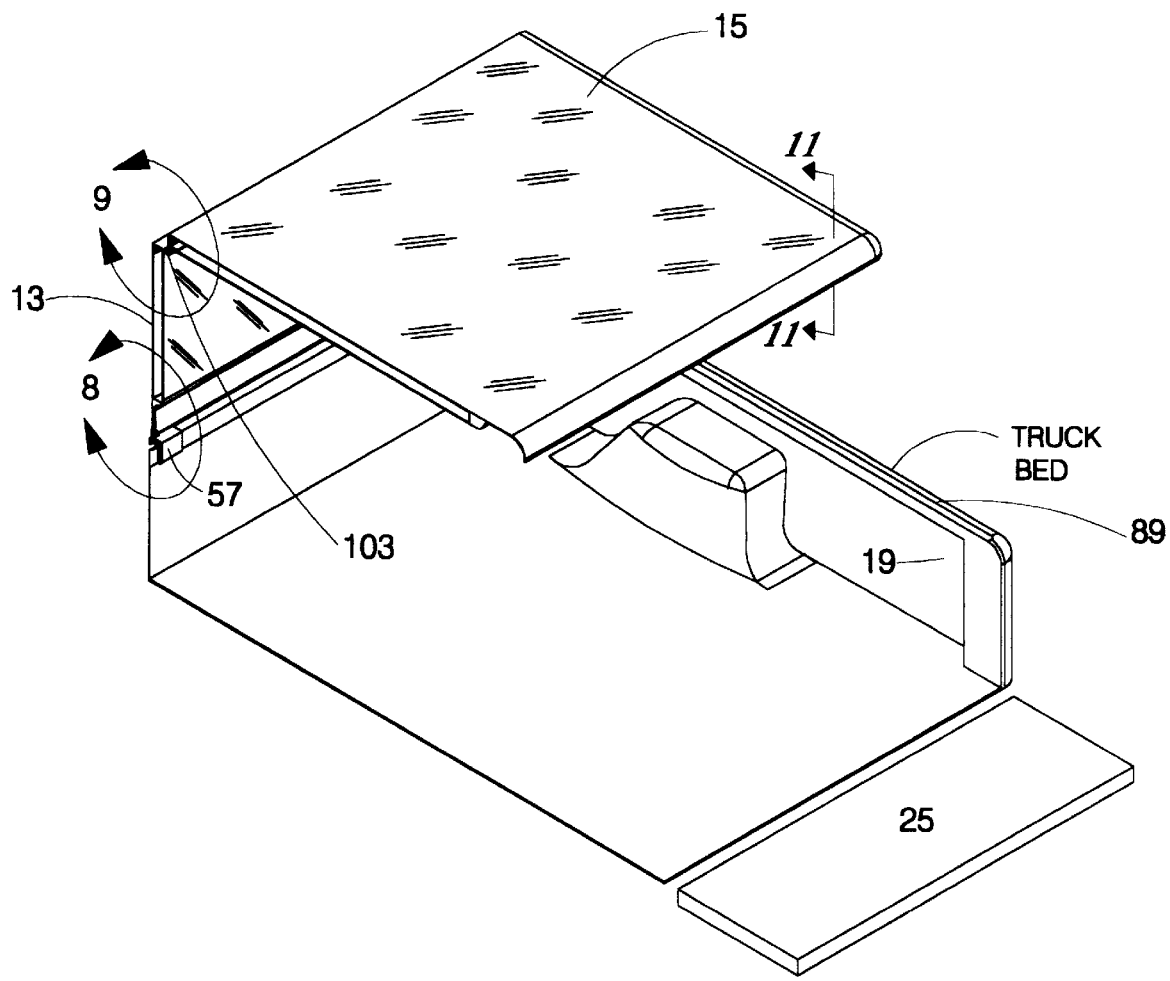
FIG. 7 is a somewhat schematic view seen with the left side of the truck bed removed to show further details of attachment and articulating hinged relationship.

Referring to FIG. 7, a somewhat schematic view seen with the left side of the truck bed 17 removed to show further details of various attachment and articulating hinged relationships. Hinge 57 is seen as well as a hinge 103.

Figure 8:
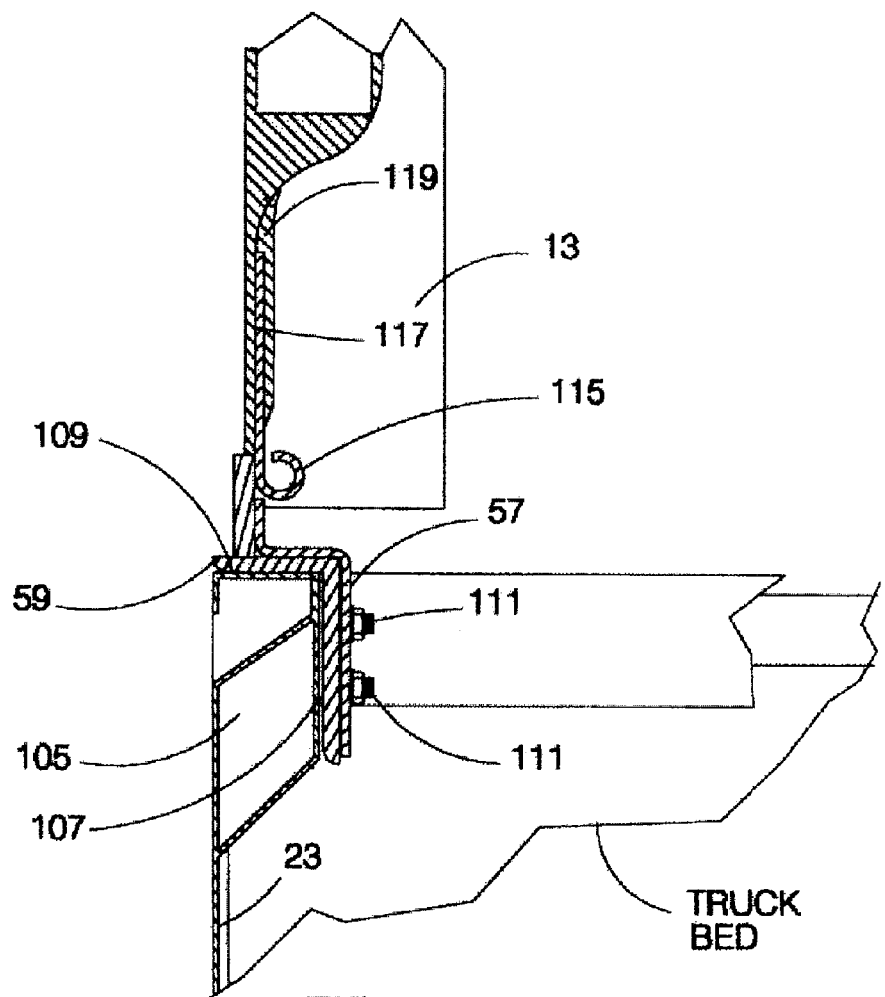
FIG. 8 is a side sectional view of the base hinge where the lid and cover assembly first portion pivots with respect to other structure attached to the vehicle body.

FIG. 8 is a side sectional view of the base hinge 57 and illustrating the details thereof. The front wall 23 may extend upwardly to include a quadrilateral section supporting an inner vertical wall 107. The inner vertical wall 107 extends up to meet a horizontal wall 109. The left "L" support 59 fits over the wall 109 and against the wall 107 and is shown as being bolted directly to bolts 111 extending from the wall 107. Bolts 111 may be welded to the wall 109 or the bolts 111 may be threaded into the wall 109. Bracket 57 is pivotally connected to a hinge portion 115 which includes a scroll shape connected to an upper plate 117. The upper plate 117 may be covered by a protective layer 119. The hinge 115 need only be set to move over a ninety degree range and in FIG. 8, the position of the first portion 13 is seen in the vertical position.

Figure 9:
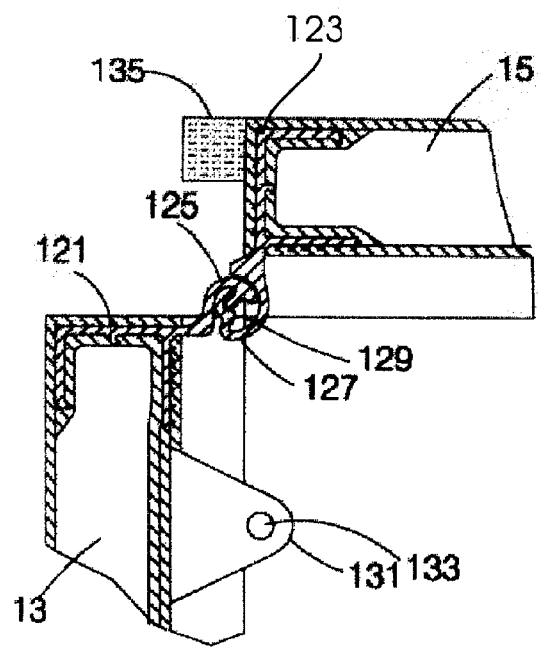
FIG. 9 is a side sectional view of a first embodiment of a hinge which permits articulation of the first and second portions of the lid and cover assembly as a pair of laterally elongate complementary hinge members.

Referring to FIG. 9, a side sectional view of a first embodiment of a hinge which permits articulation of the first and second portions 13 and 15 of the lid and cover assembly 11 as a pair of laterally elongate complementary hinge members. A first hinge member 121 is negrated into the first portion 13, and a second hinge member 123 is integrated into the second portion 15. The hinge members 121 and 123 fit closely complementarily together to form a continuous seal across the entire lateral length of the hinge members 121 and 123. Hinge member 121 has a curved positive member 125 which fits within a curved negative member 127. The curved negative member 127 has a void space 129 within which curved positive member 125 follows a circular sweeping path. Throughout the ninety degree angular pivot range, the hinge members 121 and 123 form a sealed relationship which will not allow water or air to enter through the hinge formed by the hinge members 121 and 123. This is especially important where the hinge action lies at the bottom of the depth of thickness of the lid and cover assembly 11.

Also seen in FIG. 9 is a lug 131 having an aperture 133 for pivoting attachment to the left forward spring assembly 33. Also seen is a projection or support 135 extending from the second portion 15 which is provided as a lateral stabilizing member to prevent hinge member 121 from moving with respect to hinge member 123, when the first and second portions 13 and 15 are in a generally coplanar (flat) relationship.

Figure 10:
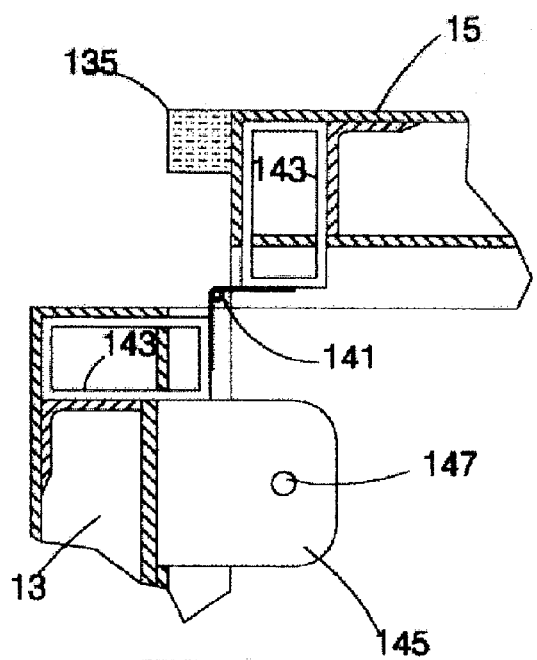
FIG. 10 is a side sectional view of a second embodiment of a hinge which permits articulation of the first and second portions of the lid and cover assembly as a laterally elongate, typically metal hinge.

FIG. 10 is a side sectional view of a second embodiment of a hinge, taken from the same general perspective as seen in FIG. 9. A hinge 141 is attached to reinforcing blocks 143 which are utilized as expanded area structures mounted within the first and second portions 13 & 15. A differently shaped lug 145 is provided with a lug aperture 147. The hinge 141 is typically made of metal and will likely include multiple screws, rivets, or bolts in being connected to the reinforcing blocks 143.

Figure 11:
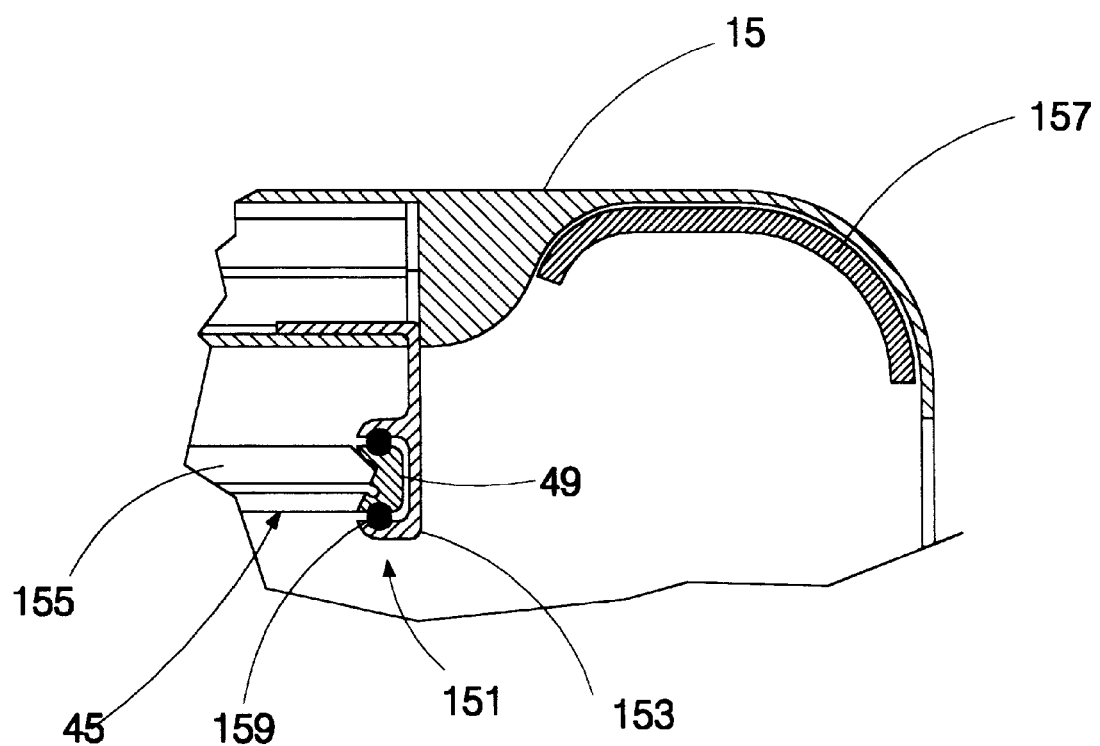
FIG. 11 is a partial sectional view into the second portion, taken along line 11—11 of FIG. 7 and illustrating an axially slidable shade assembly and adjacent rubber "C" shaped gasket for sealing about the truck vehicle bed upper side members.

FIG. 11 is a partial sectional view into the second portion as seen along line 11—11 of FIG. 7. Illustrated is an axially slidable shade assembly 151 including a sliding bracket 153 having a "c" shaped holder which supports shade 45 including its side brackets 49 which may include an end bracket 155 as formed into a frame with the side frame supports 47 & 49. Sliding bracket 153 need not have the "c" shape and may be any sort of supportive shape, especially since the shade 45 is normally expected to be very light. Other examples of structures may be a shelf extending across the bottom of the shade 45, especially where the shade 45 is light and this may be advantageous to protect the shade 45. A cloth or other protective cover may also be used as a shelf to provide a structure with "give" and which protects the shade 45.

To the right of the bracket 153, the underside shape of the second portion 15 has a curvature which may roughly correspond to the horizontal upper portion 89 of the right fender wall 19. A soft rubber "c" shaped gasket 157 (fitting generally within the inverted "c" shaped space can provide sealing against the horizontal upper portion 89. The gasket 157 can be made so large and soft that it can be made to generally seal against any shape of horizontal upper portion 89. Between the rearwardly extending shade 45 and the sliding bracket 157, there may be employed bearings 159 to facilitate deployment of the rearwardly extending shade 45, especially over the path of its rearward travel as it is extended beyond the end of the second portion 15.

Figure 12:
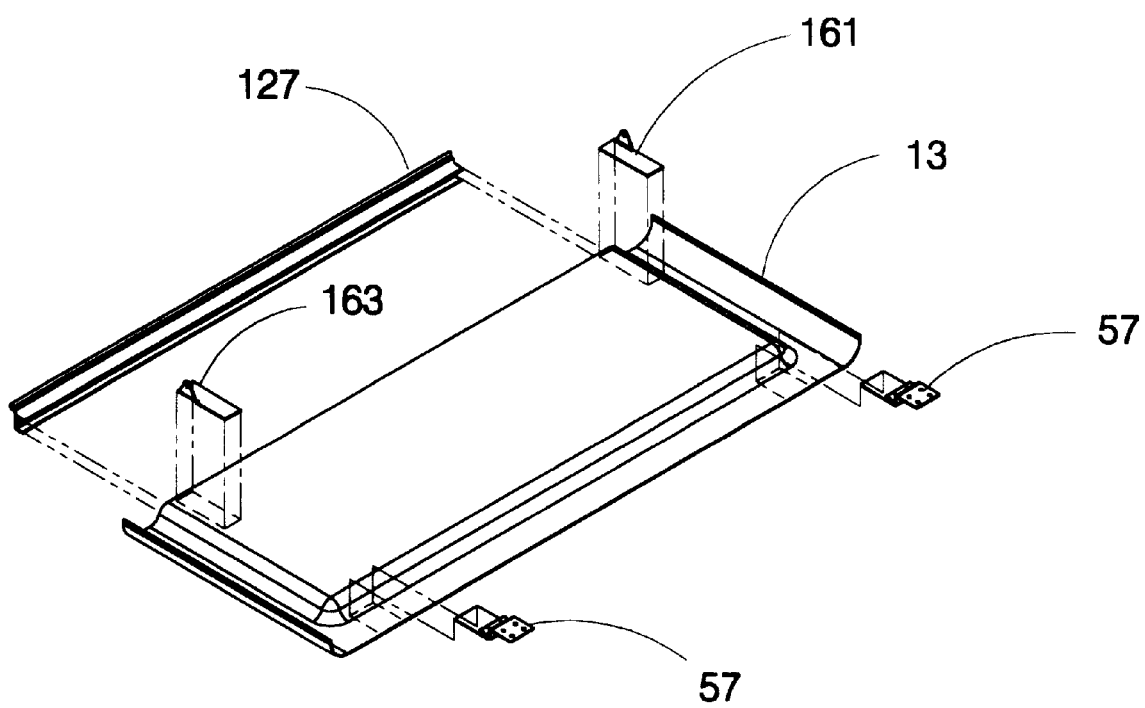
FIG. 12 is an underside view of an embodiment of the lid and cover assembly with the wide lateral hinge and focussing upon the first portion and illustrating the use of blocks to prevent angular positioning of said first portion with respect to said second portion of more than ninety degrees.

Referring to FIG. 12, an underside view of the first portion 13 shown looking down onto its underside and showing the connection of the hinges 57. At the second, rearward side of the first portion a pair of blocks, including block 161 a block 163 are mounted to extend away from the planar underside of the first portion 13 of the lid and cover assembly 11. The blocks 161 and 163 prevent the second portion 15 from assuming an acute angle with respect to the first portion 13. This will enable the force and angle settings of the spring assemblies 31, 33, 35, and 37 to be set to exert a more forwardly force without the possibility of the first portion 13 moving forwardly to contact a cab of the vehicle. The forwardly set force, rather than cause the first portion 13 to contact the cab, will contribute to the support of both the first and second portions 13 and 15 and will enable the lid and cover assembly 11 to remain deployed in an upward position, despite opposing forces, such as would come from wind, should the vehicle be moved.

Figure 13:
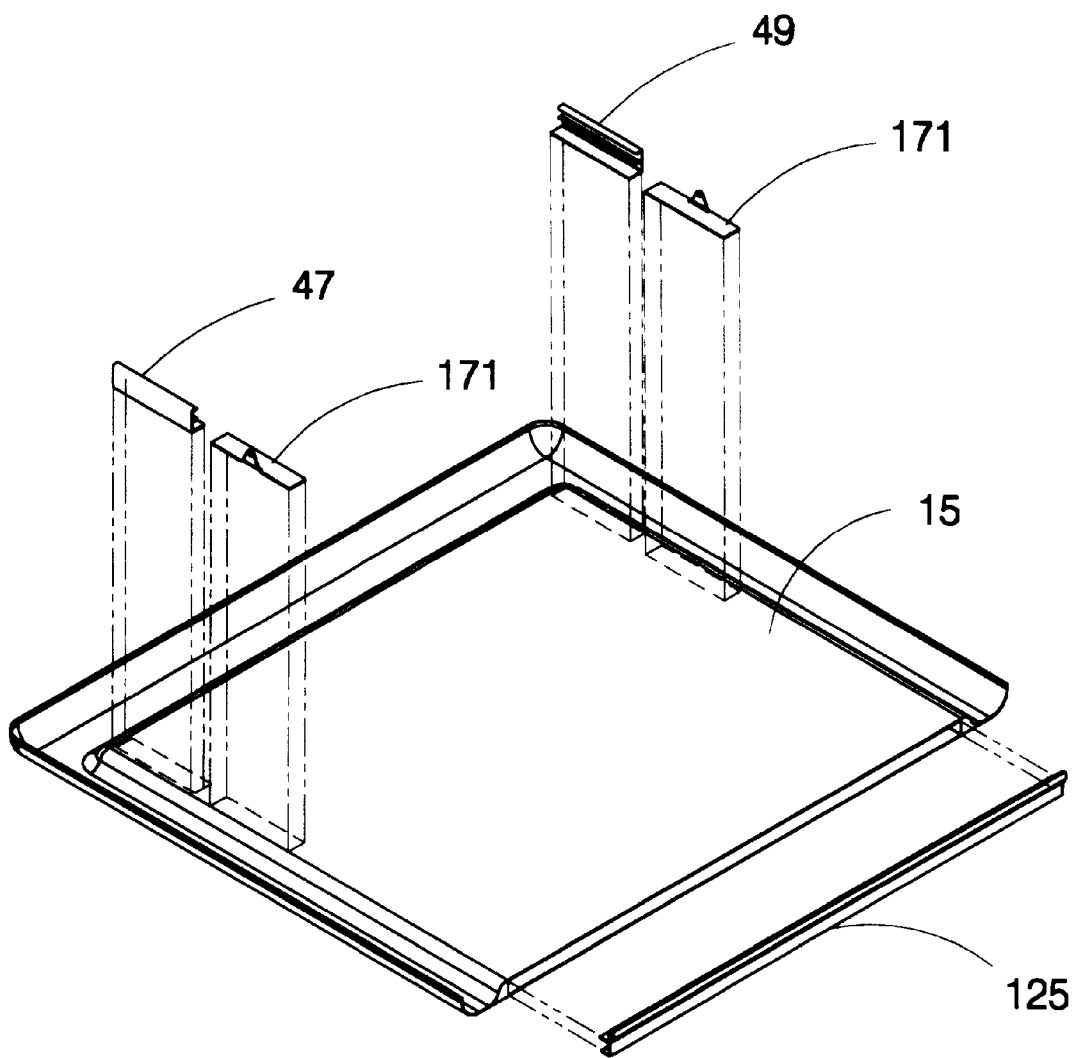
FIG. 13 is an underside view of an embodiment of the lid and cover assembly with the wide lateral hinge and focussing upon the second portion and illustrating the attachment of underside structures to support the shade and pivot plates.

Referring to FIG. 13 is an underside view of the second portion 15 and illustrating the attachment of the frame supports 47 and 49, the curved positive member 125. A reinforcing pivot plate 171 is shown for attachment to the second portion 15. Smaller versions of this member have been shown, but the expanded mounting plate of the reinforcing pivot plate 171 is useful to distribute the load of support from the spring assemblies 35 and 37.

While the present invention has been described in terms of a lid and cover assembly for a vehicle, and in terms of several embodiments in which varying degrees of deployment are possible, one skilled in the art will realize that the structure and techniques of the present invention can be applied to many similar structures. The present invention may be applied in any situation where controlled deployment of a covering structure in an inexpensive manner is desired.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A lid and cover combination comprising:
    a first portion having a forward end for pivotal mounting with respect to a front wall of a vehicle bed, and a second end;
    a second portion having a forward end pivotally articulated to said second end of said first portion, and a second end;
    a pair of front brackets for attachment to the upper forward corners of said vehicle bed;
    a pair of rear brackets for attachment to the upper right and upper left sides of said vehicle bed;
    a pair of front force assembly members each having a first end for attachment to said first portion and a second end for attachment to one of said front brackets and for applying sufficient lifting force to assist in raising said first portion to and supporting said first portion in a first open position away from said truck bed and in a second closed position secured onto said truck bed; said front force assemblies being mounted so as to impart forward force on said first portion when said first portion is in said open position; and
    a pair of rear force assembly members each having a first end for attachment to said second portion and a second end for attachment to one of said rear brackets and for applying sufficient lifting force to assist in raising said second portion to and supporting said second portion in a first open position away from said truck bed and supporting said second portion in a second closed position secured onto said truck bed.

2. The lid and cover combination as recited in claim 1 wherein said pivotal articulation of said second portion with respect to said first portion includes a laterally wide hinge having a curved positive member attached to one of said first and second portions and a curved negative member, within which said curved positive member travels, connected to the other of said first and said second portions to provide a waterproof seal between said curved negative member and said curved positive member.

3. The lid and cover combination as recited in claim 1 and further comprising a rearwardly deployable shade carried in a stowed position underneath at least one of said first and said second portions.

4. The lid and cover combination as recited in claim 3 wherein said shade comprises a length of material supported between at least a pair of frame supports and wherein said second portion includes a support within which said shade is slidably deployable.

5. The lid and cover combination as recited in claim 1 wherein said force assembly members are spring force assembly members.

6. The lid and cover combination as recited in claim 1 and further comprising structures attached to one of said first and said second portions which limit the angular displacement of said first portion with respect to said second portion.

7. The lid and cover combination as recited in claim 1 in which said force assembly members are gas spring assemblies.

8. The lid and cover combination as recited in claim 1 in which each of said front brackets is integral with the corresponding rear bracket.

9. A lid and cover combination comprising:
    a first portion having a forward end for pivotal mounting with respect to a front wall of a vehicle bed, and a second end;
    a second portion having a forward end pivotally articulated to said second end of said first portion, and a second end;
    a deployable shade carried in a stowed position underneath at least one of said first and said second portions;
    said shade comprising a length of material supported between at least a pair of frame supports;
    said second portion including a support within which said shade is slidably deployable;
    a plurality of force assembly members each having a first end attached to at least one of said first and second portions and second ends for attachment to depend from said vehicle bed and for supporting said first and second portions in a first open position away from said truck bed and in a second closed position secured onto said truck bed.

* * * * *